Figure 1:
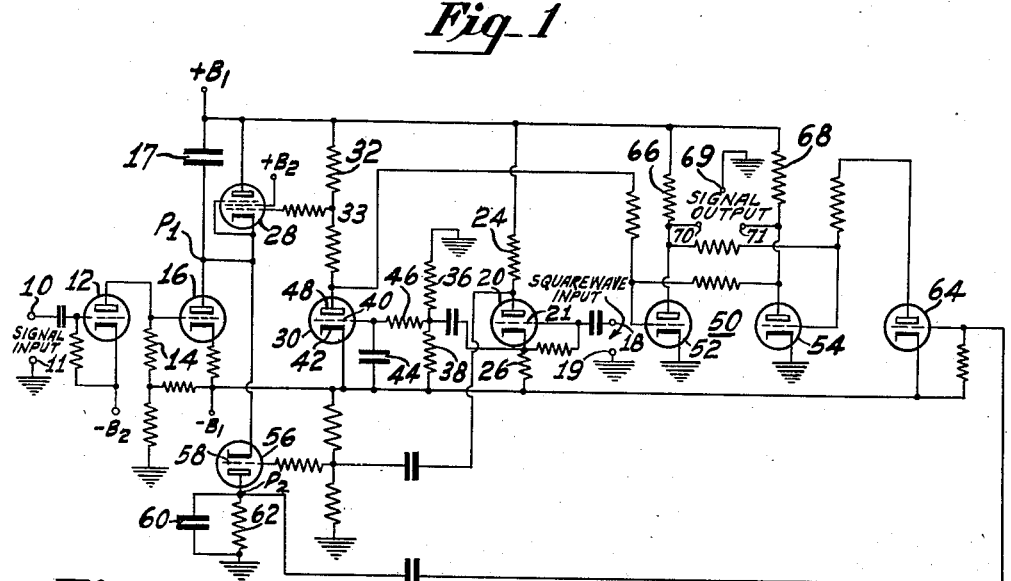

Aug. 12, 1952         L. I. GOLDFISCHER         2,606,975
         INTEGRATING TYPE TELEGRAPH SIGNAL DETECTOR
                    Filed July 27, 1949

INVENTOR
LESTER I. GOLDFISCHER
BY
ATTORNEY

Patented Aug. 12, 1952

2,606,975

UNITED STATES PATENT OFFICE 2,606,975

INTEGRATING TYPE TELEGRAPH SIGNAL DETECTOR

Lester Irving Goldfischer, Queens Village, N. Y., assignor to Radio Corporation of America, a corporation of Delaware Application July 27, 1949, Serial No. 106,998

17 Claims. (Cl. 178—70)

The invention relates to telegraphy and it pertains particularly to a circuit arrangement for detecting mark-space telegraph signals by integrating the signal amplitude versus time over each signal element.

There are known methods of detecting a telegraph signal based on sampling each signal element for a period of time which is short compared to the length of a single baud. One highly undesirable characteristic of any detection method which samples the signal for short periods is that in the transmission of telegraph signals, the marking and spacing intervals which are initiated as integral multiples of baud lengths become mutilated due to multipath and noise so that the received signal contains elongated marking intervals with narrow gaps in them and shortened spacing intervals with fills in them, which will cause the elements to be interpreted incorrectly. The same narrow gaps of fills will not result in erroneous interpretations in an integrating detection system.

Electromechanical and electronic methods of integrating detection have been suggested by others in the form of constant current devices arranged to charge capacitors but were all limited to circuits charging a capacitor in one direction for marking signals and in the opposite direction for spacing signals.

Another type of integrating detector which avoids the last mentioned complication forms the subject of a copending U. S. application Serial No. 107,017, filed on July 27, 1949, by Philip E. Volz. In the device described in the latter application, recognition of mark and space is also accomplished using the principle of integration, but the method of securing the intelligence is different from the beforementioned prior art. In this previous device, mark is indicated by a pulse of one polarity going to a locking circuit and space is indicated by a pulse of the opposite polarity going to the locking circuit.

It is an object of the invention to provide an integrating circuit arrangement for detecting received telegraph signals.

It is another object of the invention to provide an arrangement for detecting telegraph signals by determining the energy content of the signal.

It is a further object of the invention to provide an integrating detector for two-condition telegraph signals which is simple and economical in construction.

It is a supplementary object of the invention to provide an integrating type of detector which is reliable but readily and simply adjustable in operation.

It is yet a further object of the invention to provide a detecting arrangement which will be unaffected by gaps or fills occurring in the mark or space bauds respectively of received signals.

It is an additional object of the invention to provide an arrangement whereby received telegraph signals are interpreted by integrating all signal elements of one nature against a reference level afforded by all signal elements of the opposite nature.

These and other objects which will appear as the specification progresses are attained according to the invention by means of a constant current device switched on and off in response to received telegraph signals, the output current flowing into a capacitor to produce a potential proportional to the integral of the amplitude over the time interval of signal elements of one nature, which potential is measured at the end of each signal element and there so interpreted unless the energy content of the signal element indicates that the condition of opposite nature occurred for a period longer than a predetermined portion of a baud whereupon the element will be thusly interpreted and then the capacitor is discharged in readiness for the succeeding signal element. In the preferred arrangement the circuit is arranged on the presumption that the signal is always mark unless a space occurs which is longer than a predetermined percentage of a baud.

Figure 2:
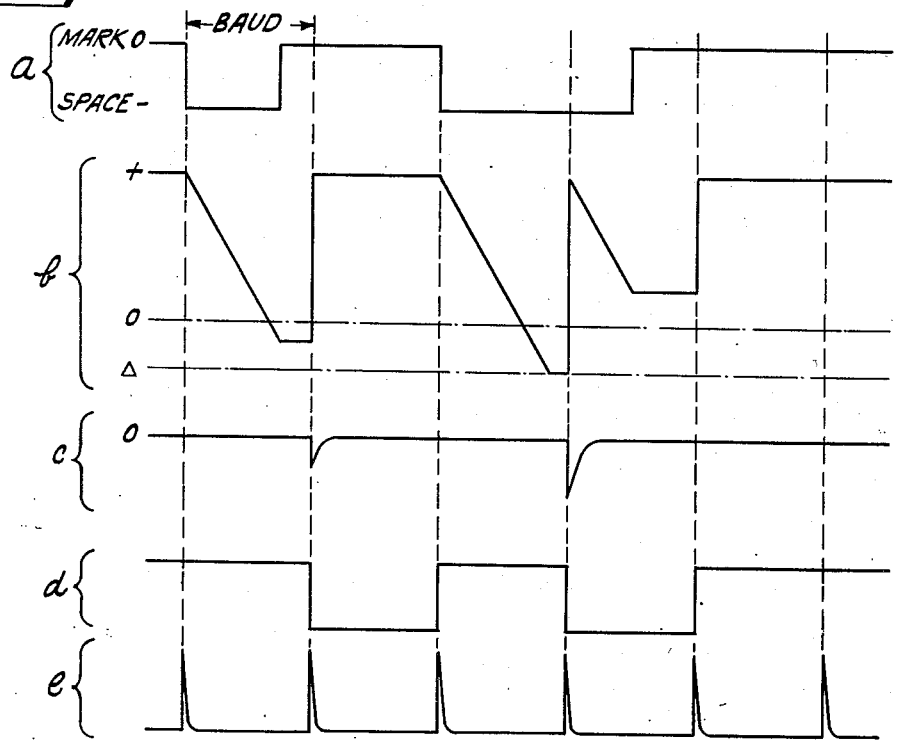

The invention will be described in detail with reference to the accompanying drawing forming part of the specification and in which:

Fig. 1 is a schematic diagram of a preferred embodiment of an integrating detector circuit according to the invention; and Fig. 2 is a diagram representing the waveforms produced by the circuit arrangement of Fig. 1.

Referring to the schematic diagram shown in Fig. 1, there is shown a circuit arrangement comprising several types of vacuum tube control circuits combined in novel manner to perform the various required functions of a detector according to the invention. The received signal is applied to terminals 10, 11. In order to integrate signal elements of one nature, the input voltage to terminals 10, 11 should be zero for elements of the other nature and sufficiently negative to cut off tube 12 for the elements of one nature. In order to integrate elements of the other nature, the conditions just described should be reversed, it being understood that the detector according to the invention will work equally well whether integrating mark elements or integrating space elements. In the interest of clarity, the invention will be described on the basis of integrating space.

When the signal element is marking, tube 12 is conducting and the voltage drop across resistor 14 is sufficient to block tube 16. When the signal element is spacing, tube 12 is blocked, tube 16 is conducting and capacitor 17 charges linearly with time. Tube 16 is a high-mu triode arranged to act as a constant current generator.

A local square wave whose frequency is equal to the baud rate of the incoming signal is applied to terminals 18, 19. The input circuit to tube 20 differentiates the square wave putting positive and negative pulses on the grid 21 of tube 20. Tube 20 acts as a clipper and phase splitter so that only positive pulses appear across resistor 24 and only negative pulses appear across resistor 26, both sets of pulses occurring at the baud rate.

The function of tube 28 is to provide a low resistance discharge path for the integrating capacitor 17 so that it may be discharged at the end of each baud in a time that is very small compared to the length of a baud. Tube 28 also provides a clamp level for capacitor 17 so that circuit point $P_1$ cannot assume a potential with respect to ground more negative than a predetermined value.

Tube 30 is normally fully conducting and the consequent voltage drop across resistor 32 is sufficient to block tube 28 until the point $P_1$ reaches the clamp level. Resistors 36 and 38 form a voltage divider which, in the absence of grid current flow from tube 30, would cause the grid to be positive with respect to cathode 42. This divider in conjunction with capacitor 44 and resistor 46 forms a delay circuit so that there is a small time interval between the instant a negative pulse is initiated by tube 20 and the instant grid 40 of tube 30 becomes negative with respect to cathode 42. The negative pulses supplied by tube 20 appear as positive pulses at the anode 48 of tube 30 allowing tube 28 to conduct to discharge capacitor 17 a short time after the end of each baud. These same positive pulses are supplied to a bistable multivibrator or regenerator locking circuit 50 consisting of tubes 52 and 54 and, in the absence of any other pulses applied to locking circuit 50, cause it to switch into or stay in its marking position with tube 52 conducting and tube 54 blocked.

Tube 56 is normally blocked. At the end of each baud a positive pulse is supplied to the grid 58 of tube 56 from tube 20 and tube 56 is placed in readiness to conduct. If circuit point $P_1$ has assumed a potential negative with respect to ground when a positive pulse appears on the grid 58 of tube 56, the latter will conduct and circuit point $P_2$ will assume essentially the same negative potential with respect to ground, assuming that the capacity of capacitor 60 is small compared to that of capacitor 17. The time constant formed by capacitor 60 and the resistance of tube 56 when conducting must be small compared to the delay interval between the end of the baud and the moment capacitor 17 begins to discharge through tube 28. Resistor 62 should be as large as possible since capacitor 60 must discharge through it. The charge and discharge of capacitor 60 forms a negative pulse which is applied to a high-mu triode amplifier tube 64. The time constants must be such that the resultant amplified pulse supplied to the locking circuit 50 is wider than that supplied by tube 30. When the last condition is met, the space pulse from tube 64 will override the mark pulse from tube 30 and cause locking circuit 50 to switch into or remain in its spacing position with tube 54 conducting and tube 52 blocked.

Therefore, when the prevailing nature of the signal element is marking, capacitor 17 remains uncharged and the positive pulse supplied by tube 30 trips locking circuit 50 so that tube 52 is conducting and tube 54 is blocked. When the prevailing nature of the signal element is spacing, capacitor 17 charges for the duration of the space, being discharged to start anew at the end of each baud. When the space endures for more than a predetermined part of a baud, at the end of that baud a pulse is produced by tube 56 and the pulse amplified by tube 64 to override the pulse from tube 30 and trip locking circuit 50 so that tube 52 is blocked and tube 54 is conducting. An output may be taken from either of resistors 66 or 68 of locking circuit 50.

Wave forms further illustrating the operation of the detector according to the invention are shown in Fig. 2 in time phase relationship. A typical signal input with distortion present is shown at $a$. The potential across capacitor 17 is shown at $b$ with the clamp level indicated by chain line $\Delta$. The space pulses derived across resistor 62 are shown at $c$ and the corresponding signal output taken from terminals 69, 71 is shown at $d$, while the mark pulses developed across resistors 32 and 33 are shown at $e$.

It should be understood that while the invention has been described with reference to a particular embodiment, the regenerator locking circuit 50 itself is not an essential part of the mark-space detector according to the invention but is only used as an example of a working embodiment, that a useable output could just as easily be obtained with other known arrangements, for example, a pulse mixer arrangement, and it should be further understood that any type of signal capable of being converted to a two-condition signal might be so connected and applied to terminals 10, 11 without departing from the spirit and the scope of the invention.

I claim:

1. A circuit arrangement for detecting telegraph signals transmitted as a train of individual signal elements of different nature, including a constant current device, a charge storage circuit coupled to said constant current device, means to switch said constant current device in response to individual elements of said telegraph signals to charge said storage circuit in accordance with the nature of the element under consideration, a signal regenerator arranged normally to reproduce a train of signal elements to one nature, a transfer circuit coupled between said storage circuit and said signal regenerator to cause said signal regenerator to reproduce a signal element of another nature in response to the charge stored in said storage circuit.

2. A circuit arrangement for detecting telegraph signals transmitted as a train of individual signal elements of different nature, including a constant current device, a charge storage circuit coupled to said constant current device, means to switch said constant current device in response to individual elements of said telegraph signals to charge said storage circuit in accordance with the nature of the element under consideration, a signal regenerator arranged normally to reproduce a train of signal elements of one nature, a transfer circuit coupled between said storage circuit and said signal regenerator to cause said signal regenerator to reproduce a signal element of another nature in response to the charge stored in said storage circuit, and means rendering said transfer circuit operable only at the end of said element under consideration.

3. A circuit arrangement for detecting telegraph signals transmitted as a train of individual signal elements of different nature, including a constant current device, a charge storage circuit coupled to said constant current device, means to switch said constant current device in response to individual elements of said telegraph signals to charge said storage circuit in accordance with the nature of the element under consideration, a signal regenerator arranged normally to reproduce a train of signal elements of one nature, a transfer circuit coupled between said storage circuit and said signal regenerator to cause said signal regenerator to reproduce a signal element of another nature in response to the charge stored in said storage circuit, means rendering said transfer circuit operable only at the end of said element under consideration, and means to discharge said storage circuit in readiness for the succeeding signal element.

4. A circuit arrangement for detecting telegraph signals transmitted as a train of individual signal elements of different nature, including a constant current vacuum tube circuit, a capacitor coupled to said constant current vacuum tube circuit, means to switch said constant current vacuum tube in response to individual elements of said telegraph signals to charge said capacitor in accordance with the nature of the signal element under consideration, a signal regenerator circuit arranged to continuously generate a train of signal elements of one nature, a potential responsive device coupled between said capacitor and said signal regenerator to cause the same to generate a signal element of opposite nature in response to the charge stored in said capacitor, means rendering said potential responsive device and said signal regenerator operable only at the end of said element under consideration, and means to discharge said capacitor in readiness for the succeeding signal element.

5. A circuit arrangement for detecting telegraph signals transmitted as a train of individual signal elements of different nature, including a first vacuum tube arranged as a constant current device, a capacitor coupled to said constant current device, means to apply said train of individual signal elements to said constant current device to charge said capacitor in accordance with the nature of the individual element under consideration, a signal regenerator actuated by application of a source of voltage synchronized with said signals to reproduce a train of signal elements of one nature, a unilateral impedance device coupled between said capacitor and said signal regenerator to cause said signal regenerator to reproduce signal elements of another nature when the charge in said capacitor exceeds a predetermined value, and means responsive to said voltage to render said unilateral impedance device operable only at the end of said element under consideration, and to discharge said capacitor in readiness for the succeeding signal element.

6. A circuit arrangement for detecting telegraph signals transmitted as a train of individual signal elements of different nature, including a first vacuum tube arranged as a constant current device, a capacitor coupled to said constant current device, means to apply said train of individual signal elements to said constant current device to charge said capacitor in accordance with the nature of the individual element under consideration, a signal regenerator actuated by application of a source of voltage synchronized with said signals to reproduce a train of signal elements of one nature, a unilateral impedance device coupled between said capacitor and said signal regenerator to cause said signal regenerator to reproduce signal elements of another nature when the charge in said capacitor exceeds a predetermined value, means responsive to said voltage to render said unilateral impedance device operable only at the end of said element under consideration, and means to discharge said capacitor in readiness for the succeeding signal element after said unilateral impedance device has functioned.

7. A circuit arrangement for detecting telegraph signals transmitted as a train of individual signal elements of different nature, including an electrode structure defining a controllable electron path, means to apply said signal elements to said electrode structure to block the electron path when said signal elements are of one nature and to open the electron path when said elements are of another nature, a charge storage device coupled in circuit with said electrode structure to develop a charge varying proportionally to the integral of the amplitude over the duration of each of said elements of another nature, an electron gate device coupled across said charge storage device to provide conduction when said charge is above a predetermined value to produce pulses of unidirectional current indicative of elements of said other nature, a signal regenerator coupled to said electron gate device to reproduce a train of signal elements in response to said pulses of current, a controllable discharge device coupled across said charge storage device to discharge the same, and means to render said electron gate device and said discharge device operative at the termination of each of said signal elements, said means including a delay circuit arranged to render said discharge device operative only after said electron gate device has functioned.

8. A circuit arrangement for detecting telegraph signals transmitted as a train of individual signal elements of different nature, including a vacuum tube structure defining a controllable electron path, means to apply said signal elements to said vacuum tube structure to block the electron path when said elements are of one nature and to open the electron path when said elements are of another nature, a charge storage device coupled in circuit with said vacuum tube structure to develop a charge varying proportionally to the integral of the amplitude over the duration of each of said elements of another nature, an electron gate device coupled across said charge storage device to provide conduction when said charge is above a predetermined value to produce pulses of unidirectional current indicative of elements of said other nature, a signal regenerator coupled to said electron gate device to reproduce a train of signal elements in response to said pulses of current, said signal regenerator producing a train of signal elements corresponding to elements of said one nature in the absence of said pulses of current, a controllable discharge device coupled across said charge storage device to discharge the same, and means to render said electron gate device, said discharge device and said signal regenerator operative at the termination of each of said signal elements, said means including a delay circuit arranged to render said discharge device operative only after said electron gate device and said signal regenerator have functioned.

9. A circuit arrangement for detecting telegraph signals transmitted as a train of individual signal elements of different nature, including an electron discharge device, means to apply said signal elements to said electron discharge device to block the same when said elements are of one nature and to render the same conducting when said elements are of another nature, a capacitor coupled in circuit with said electron discharge device to develop a charge varying proportionally to the integral of the amplitude over the duration of each of said elements of another nature under consideration, a vacuum tube gate coupled across said capacitor and arranged to conduct at values of said charge above a predetermined value to produce a pulse of unidirectional current indicative of the element of said other nature under consideration, a signal regenerator coupled to said vacuum tube gate to reproduce a signal element in response to said pulse of current, a variable impedance element coupled across said capacitor to discharge the same, and means to render said vacuum tube gate and said variable impedance element operative at the termination of each of said signal elements, said means including a delay circuit arranged to render said variable impedance element operative only after said vacuum tube gate has functioned.

10. A circuit arrangement for detecting telegraph signals transmitted as a train of individual signal elements of different nature, including a first vacuum tube having a cathode, a control grid and an anode, an input circuit coupled between the grid and cathode of said first tube and adapted to apply said signals thereto, a capacitor coupled to the anode of said tube, a second vacuum tube having at least a cathode, a control grid and an anode, the cathode of said second tube being connected to the anode of said first tube and one terminal of said capacitor, the anode of said second tube being connected to the other terminal of said capacitor, a third vacuum tube having a cathode, a control grid and an anode, said cathode being connected to said one terminal of said capacitor and the anode being connected to a shunt resistor-capacitor combination constituting an output load impedance, a fourth vacuum tube having a cathode, a control grid and an anode, the cathode and anode of said fourth tube being connected to the grid circuit of said second vacuum tube, a further vacuum tube having a cathode, a control grid and an anode, separate load resistors coupled to the anode and cathode respectively of said further tube, the grid of said third vacuum tube being connected via differentiating circuity to the anode load resistor of said further tube, the grid of said fourth tube being connected to the cathode load resistor of said further tube, the grid of said further tube being connected to terminals to which a source of voltage synchronized with said signals is applied, and a time delay network interposed between said fourth vacuum tube and said further vacuum tube, thereby in sequence to charge said capacitor to a potential indicative of the nature of the individual signal element under consideration, to connect said capacitor through said third vacuum tube to said output load impedance at the end of the signal element under consideration to develop a pulse therein of polarity indicative of elements of one nature only, and to discharge said capacitor in readiness for the succeeding signal element.

11. A circuit arrangement for detecting telegraph signals transmitted as a train of individual signal elements of different nature, including an electron discharge device constituting a controllable electron path, means to apply said train of signal elements to said electron discharge device to open the electron path when said elements are of one nature and to close the electron path when said elements are of another nature, a charge storing device coupled in circuit with said electron discharge device to develop a charge proportional to the amplitude of elemental portions of one nature integrated over the duration of the signal element under consideration, a sampling circuit coupled to said charge storing device, a timing circuit coupled to said sampling circuit to render the latter operative at the termination of the signal element under consideration, said sampling circuit being biased so that an output pulse indicative of said one nature is produced only if the developed charge exceeds the value of said bias.

12. A circuit arrangement for detecting telegraph signals transmitted as a train of individual signal elements of different nature, including a bistable multivibrator circuit, a timing circuit coupled to said bistable multivibrator circuit, means to apply a wave of frequency substantially equal to the recurrence frequency of said individual signal elements to said timing circuit to trigger said bistable multivibrator to produce a train of regenerated signal elements of one nature, a constant current device, a charge storing device in circuit with said constant current device, means to apply said train of signal elements of different nature to said constant current device to develop a charge proportional to the amplitude of elemental portions of the other nature over the duration of the signal element under consideration, and a translating device coupled to said timing circuit and between said charge storing device and said bistable multivibrator circuit to produce a current pulse when the prevailing nature of the signal element under consideration is other than said one nature to trigger said multivibrator in a manner opposite to triggering by said timing circuit and interpose a regenerated signal element of said other nature in said train of regenerated signal elements of said one nature.

13. A circuit arrangement for detecting telegraph signals transmitted as a train of individual signal marking and spacing elements, including a bistable multivibrator circuit, a timing circuit coupled to said bistable multivibrator circuit, means to apply a wave of frequency substantially equal to the recurrence frequency of said individual signal elements to said timing circuit to trigger said bistable multivibrator to produce a train of regenerated signal marking elements, a constant current device, a charge storing device in circuit with said constant current device, means to apply said train of signal elements to said constant current device to develop of charge proportional to the amplitude of spacing elemental portions over the duration of the signal element under consideration, and a translating device coupled to said timing circuit and between said charge storing device and said bistable multivibrator circuit to produce a current pulse when the prevailing nature of the signal element under consideration is spacing to trigger said multivibrator in a manner opposite to triggering by said timing circuit and interpose a regenerated signal spacing element in said train of regenerated signal marking elements.

14. A circuit arrangement for detecting telegraph signals transmitted as a train of individual signal elements of different nature, including a bistable multivibrator circuit, a timing circuit coupled to said bistable multivibrator circuit, means to apply a wave of frequency substantially equal to the recurrence frequency of said individual signal elements to said timing circuit to trigger said bistable multivibrator to produce a train of regenerated signal elements of one nature, a constant current device, a charge storing device in circuit with said constant current device, means to apply said train of signal elements of different nature to said constant current device to develop a charge proportional to the amplitude of elemental portions of the other nature over the duration of the signal element under consideration, and a translating device coupled to said timing circuit and between said charge storing device and said bistable multivibrator circuit to produce a current pulse when the prevailing nature of the signal element under consideration is other than said one nature to trigger said multivibrator in a manner opposite to triggering by said timing circuit and interpose a regenerated signal element of said other nature in said train of regenerated signal elements of said one nature, and means coupled to said timing circuit to discharge said charge storing device in readiness for the succeeding signal element, said means including a clamping circuit for establishing the point at which said translating device becomes effective to produce said current pulse.

15. A circuit arrangement for detecting telegraph signals transmitted as a train of individual signal elements of different nature, including a bistable multivibrator circuit, a signal integrating circuit comprising a constant current device and a charge storing device, said signal integrating circuit producing a charge in said charge storing circuit proportional to the amplitude of elemental portions of one nature integrated over the duration of the signal element under consideration, a tripping circuit coupled between said charge storing device and said multivibrator circuit and a discharge circuit coupled between said charge storing device and said multivibrator circuit, a timing circuit coupled to said multivibrator circuit, said tripping circuit and said discharge circuit, said timing circuit being arranged to produce a triggering pulse for actuating said multivibrator circuit to produce a train of regenerated signal elements of another nature, a sampling pulse for actuating said tripping circuit to produce a tripping pulse when the prevailing nature of the signal element under consideration is of said one nature to override the corresponding triggering pulse and cause said multivibrator circuit to produce a regenerated signal element of said one nature, and a discharge pulse for causing said discharge circuit to discharge said charge storing device in readiness for the succeeding signal element.

16. A circuit arrangement for detecting telegraph signals transmitted as a train of individual signal elements of different nature, including a bistable multivibrator circuit, a signal intergrating circuit comprising a constant current device and a charge storing device, said signal integrating circuit producing a charge in said charge storing circuit proportional to the amplitude of elemental portions of one nature integrated over the duration of the signal element under consideration, a tripping circuit coupled between said charge storing device and said multivibrator circuit and a discharge circuit coupled between said charge storing device and said multivibrator circuit, a timing circuit coupled to said multivibrator circuit, said tripping circuit and said discharge circuit, said timing circuit being arranged to produce a triggering pulse for actuating said multivibrator circuit to produce a train of regenerated signal elements of another nature, a sampling pulse for actuating said tripping circuit to produce a tripping pulse when the prevailing nature of the signal element under consideration is of said one nature to override the corresponding triggering pulse and cause said multivibrator circuit to produce a regenerated signal element of said one nature, and a discharge pulse for causing said discharge circuit to discharge said charge storing device in readiness for the succeeding signal element, said tripping circuit having a characteristic extending the duration of said tripping pulse beyond that of the corresponding triggering pulse, and said discharge circuit including a time delay element to prevent discharge of said charge storing device prior to operation of said tripping circuit.

17. A circuit arrangement for detecting telegraph signals transmitted as a train of individual signal elements of different nature, including a signal regenerator circuit responsive to current pulses of opposite polarity to reproduce signal elements of opposite nature, a constant current generator having an input circuit and an output circuit, a charge storing device connected to the output circuit of said constant current generator, means to apply the signal element under consideration the the input circuit of said constant current generator to produce a substantially constant flow of current through said charge storing device for elemental portions of given nature and substantially zero current flow for elemental portions of opposite nature to develop a charge proportional to the elemental portions of said given nature integrated over the duration of said signal element under consideration, and a charge sampling device coupled between said charge storing device and said signal regenerator circuit to interpret the charge stored in said charge storing device and produce a pulse of given polarity indicative of said given nature prevailing for said signal element under consideration, a variable impedance discharge device coupled to said charge storing device, a timing circuit coupled to said charge sampling device and said discharge device, means to apply a timing wave of frequency substantially equal to the recurrence frequency of said individual signal elements to said timing circuit to cause said sampling circuit to interpret the charge stored in said charge storing device and produce a pulse of said given polarity when the signal element under consideration is of given nature to cause said signal regenerator circuit to reproduce a signal pulse of corresponding nature and to apply a pulse of opposite polarity to said signal regenerator circuit to urge said circuit to reproduce a signal pulse of opposite nature, the time constant of said charge sampling device having a value at which said pulse of given polarity is of longer duration than said pulse of opposite polarity thereby to insure control by said charge sampling device.

LESTER IRVING GOLDFISCHER.

REFERENCES CITED

The following references are of record in the file of this patent:

UNITED STATES PATENTS

| Number | Name | Date |
| --- | --- | --- |
| 1,689,263 | Vernam | Oct. 30, 1928 |
| 2,039,629 | Burton | May 5, 1936 |
| 2,470,722 | Rattner | May 17, 1949 |

FOREIGN PATENTS

| Number | Country | Date |
| --- | --- | --- |
| 271,155 | Great Britain | May 18, 1927 |